United States Patent [19]

Wycech

[11] Patent Number: 4,769,391
[45] Date of Patent: Sep. 6, 1988

[54] REINFORCEMENT INSERT FOR A STRUCTURAL MEMBER AND METHOD OF MAKING AND USING THE SAME

[75] Inventor: Joseph Wycech, Grosse Pointe Woods, Mich.

[73] Assignee: Essex Composite Systems, Fraser, Mich.

[21] Appl. No.: 131,597

[22] Filed: Dec. 11, 1987

Related U.S. Application Data

[63] Continuation-in-part of Ser. No. 811,041, Dec. 19, 1985.

[51] Int. Cl.⁴ .............................. C08J 9/22; C08J 9/32; C08G 59/02; B29C 67/22
[52] U.S. Cl. ...................................... 521/54; 264/454; 264/46.6; 264/46.7; 264/49; 264/267; 264/DIG. 6; 264/DIG. 7; 428/313.5; 428/317.9; 521/135; 521/139; 523/218; 523/219
[58] Field of Search ................... 521/54, 135, 139; 264/45.4, 46.6, 46.7, 49, 267, DIG. 6, DIG. 7; 523/218, 219; 428/313.5, 317.9

[56] References Cited

U.S. PATENT DOCUMENTS

| | | |
|---|---|---|
| 2,632,922 | 3/1953 | Kish . |
| 3,608,031 | 9/1971 | Stastny et al. ............... 264/126 |
| 3,611,583 | 10/1971 | Anderson et al. ............ 264/DIG. 6 |
| 3,842,020 | 10/1974 | Garrett . |
| 3,867,495 | 2/1975 | Heller ........................ 264/51 |
| 3,899,556 | 8/1975 | Heide et al. ................ 264/44 |
| 3,909,058 | 9/1975 | Krämer et al. ............... 293/136 |
| 4,014,826 | 3/1977 | Yunan . |
| 4,040,165 | 8/1977 | Miessler et al. ............. 264/46.6 X |
| 4,268,574 | 5/1981 | Peccenini et al. ............ 428/315 |
| 4,311,541 | 1/1982 | Fultz .......................... 264/45.4 X |
| 4,396,565 | 8/1983 | Tomita et al. ............... 264/44 |
| 4,405,543 | 9/1983 | Murphy et al. ............... 264/123 |

OTHER PUBLICATIONS

*Whittington's Dictionary of Plastics*, by Lloyd R. Whittington, Stamford, Conn., Technomic, c. 1968, Preface; pp. 25, 59, 60, 154.

*The Condensed Chemical Dictionary*, Tenth Edition, Revised by Gessner G. Hawley, New York, Van Nostrand Reinhold, c. 1981, p. 1085.

*Primary Examiner*—Philip Anderson
*Attorney, Agent, or Firm*—Cullen, Sloman, Cantor, Grauer, Scott & Rutherford

[57] ABSTRACT

A precast composite plastic reinforcement insert, method of making the reinforcement insert and method of reinforcing a structural member. The insert includes pellets which are formed of a mixture of a thermoplastic polymeric resin and a blowing agent. Polymeric resins disclosed include a one-part epoxy with a thermal curing system or a thermoplastic polyester resin. The pellets in one embodiment are retained within a matrix of expanded polystyrene and in combination form the insert. The insert is formed in a mold cavity which receives the pellets and unexpanded polystyrene which is expanded during the process by heating the same within the mold cavity. The insert is used to reinforce a structural member by placing it in the structural member prior to a thermal paint curing operation. The insert is transformed into a lightweight, high-strength reinforcement during the paint curing operation wherein the expanded polystyrene of one embodiment is vaporized, the pellets are expanded and then cured, forming bonds between adjacent pellets and the structural member. If the pellets are not retained in a styrofoam matrix, the insert may be coated with a polymeric adhesive prior to placing it in the structural member.

23 Claims, 2 Drawing Sheets

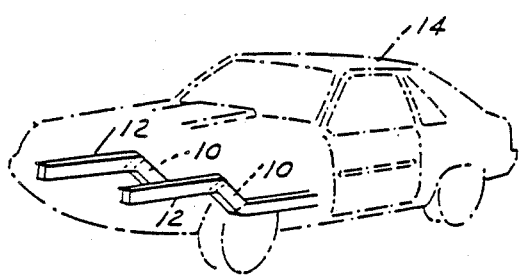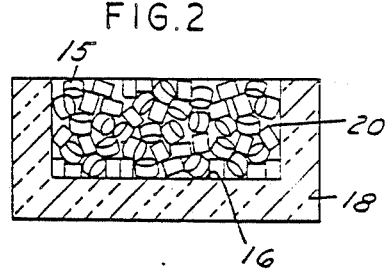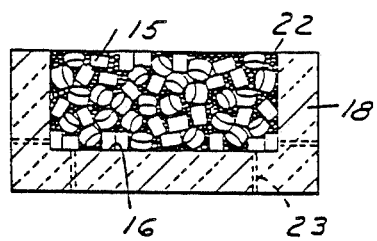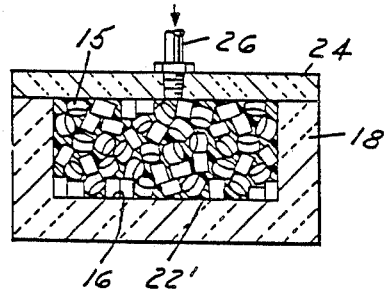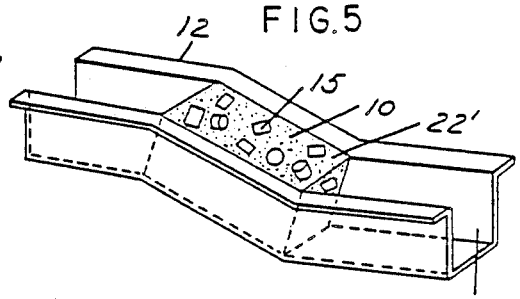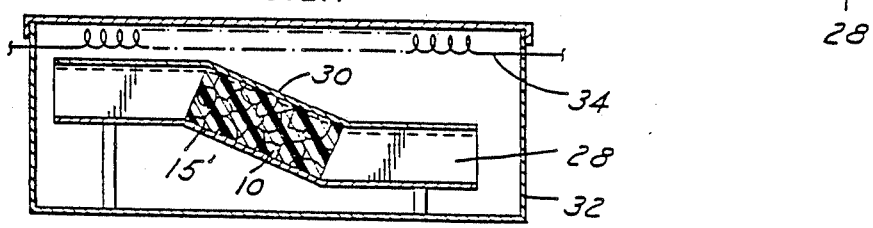

REINFORCEMENT INSERT FOR A STRUCTURAL MEMBER AND METHOD OF MAKING AND USING THE SAME

This application is a continuation-in-part of application Ser. No. 811,041, filed Dec. 19, 1985.

BACKGROUND OF THE INVENTION

I. Technical Field

The present invention relates to a method and apparatus for reinforcing a structural member. More particularly, the invention relates to a composite, precast plastic insert for reinforcing a structural member which expands and may bond to the structural member when heated. The present invention further relates to the method of making and using the precast reinforcement insert.

II. Brief Description of the Background Art

Reinforcements for structural members used in the manufacture of vehicles and other objects formed of sheet metal have generally been metal parts that are welded in place. The metal parts used as reinforcements add weight, are expensive and add additional steps to the manufacturing process.

One attempt to eliminate the use of welded reinforcements is disclosed in U.S. Pat. No. 3,909,058 to Kramer wherein it is suggested that a structural part may be filled with a foamed plastic material. A disadvantage inherent in the use of foamed plastic as a structural reinforcement is that it is difficult to control the process sufficiently to assure accurate location of the reinforcement in a portion of the structural member. Also, the foamed plastic may be harmed by exposure to the hot temperatures encountered in use and in paint curing ovens used in modern automotive, appliance and other assembly plants. Structural foamed plastic generally is not intended to bond to the structural member but instead relies upon completely filling a cavity with foamed plastic which prevents the flow of air throughout the structural member, with the possible result of moisture being trapped within the structural member. Foamed plastic reinforcements are not generally as strong or crush resistant as metal reinforcements.

Another approach to reinforcing a hollow structural member is disclosed in U.S. Pat. No. 4,405,543 to Murphy which suggests packing a cavity in a part to be filled with a loose thermoset material including glass microbubbles or phenolic microballoons. The loose thermosetting material is packed into the part and cured in the final part into a low density, fused solid mass. Such a process is inappropriate for use in assembly line operations because the material must be packed into the part, or structural member, to be filled by special presses.

Applicant's copending application, Ser. No. 674,226, filed Nov. 23, 1985 and now U.S. Pat. No. 4,610,836, and entitled "Method and Apparatus for Structural Reinforcement", discloses a structural reinforcement comprising a cloth impregnated with a low temperature cure, one-part epoxy and is coated on one face with a high temperature cure one-part epoxy. The cloth may be stamped and plastically deformed to fit within the confines of a structural member and filled with glass macrospheres which are coated with a low temperature curing adhesive. Subsequent heating of the structural member in a paint oven cures the high temperature epoxy, bonding the macrospheres to the epoxy-coated cloth and to each other to reinforce the structural member.

In another embodiment disclosed in Applicant's copending application, glass microspheres coated with an adhesive are blown in particulate form, as loose pellets, into a hollow structural member and positioned within the structural member by means of baffle plates positioned in the hollow structural member. Another concept disclosed in the application is partially filling the structural member with a heat vaporizable material, such as styrofoam pellets, then filling an adjacent portion of the structural member with the loose adhesive-coated macrospheres in the region which requires reinforcement. The heat vaporizable material is then vaporized by the heat of the paint curing oven while the adhesive-coated macrospheres are cured in place. Applicant's prior work resulted in a reinforcement which uses glass microspheres to reinforce a structural member without preventing air flow therethrough. In some instances, it is desirable to provide a reinforcement which prevents air flow through the structural member.

The present invention provides an improved reinforcement, a new, simplified method of making composite precast reinforcement inserts and a new method of using such inserts as high strength, crush-resistant reinforcements of structrual members which do not require special tooling.

SUMMARY OF THE INVENTION

According to the invention, a precast reinforcement insert for structural members is provided which is made up of a plurality of pellets formed of a thermosetting polymeric resin and a blowing agent, such as unexpanded microspheres, which are embedded in a matrix of expanded polystyrene. The expanded polystyrene is formed in place in the interstitial spaces between the pellets. The precast reinforcement insert is preferably used in structures which are later processed through a high temperature region, such as a paint curing oven, wherein the expanded polystyrene is vaporized, the microspheres and the pellets are expanded and the polymeric resin is thermoset.

An alternative embodiment of the insert of the present invention comprises a plurality of heat expandable polymer pellets, preferably thermoset pellets fused together in a unitary insert. The expandable pellets are formed of a mixture of a polymeric resin and a blowing agent. The blowing agent may be a liquid form blowing agent or a particulate form such as unexpanded microspheres.

The method of reinforcing a hollow structural member according to the present invention includes the step of placing a precast composite plastic insert as described above into the structural member. The structural member is then heated, causing the expanded polystyrene to vaporize and the thermally expandable material in the pellets to expand. The polymeric resin is melted and thermoset to cause the pellets to bond to each other and to the walls of the structural member and adjacent pellets.

The method of reinforcing a hollow structural member with the alternative embodiment of the insert follows the same steps except that there is no expanded polystyrene to vaporize.

The method of making the precast reinforcement insert in accordance with the present invention comprises the steps of filling a mold cavity of a die with a plurality of pellets comprising thermosetting polymeric resin intermixed with unexpanded microspheres which are thermally expandable. The interstices between the pellets are filled with an unexpanded polystyrene pellets. The die is then heated with steam, hot air or other hot gases which cause the polystyrene to expand about the pellets to form a precast reinforcement insert.

If the alternative embodiment of the precast reinforcement insert is made, the pellets are placed in the mold cavity and are then fused together within the spaced provided by the mold cavity. The pellets are fused together by heating the die with steam, hot air or other hot gases which cause the pellets to partially melt.

A primary feature of the present invention is that a highly crush-resistant reinforcement is provided which is made of high strength glass bubble filled polymer resin, preferably thermoset pellets, that is extremely lightweight.

An important feature of the present invention is the provision of a unitary, precast reinforcement insert which is free of small voids, pockets or openings which may fill up with cleaners, phosphate coating solutions and other immersion fluids. The reinforcement insert does not retain the immersion fluids or carry the fluids into subsequent baths.

Another advantage of the present invention is that the pellets, when exposed to the heat of the paint curing oven, expand to fully fill a portion of the structural member, whereby air or water flow through the structural member is elminated. By fully filling a portion of the structural member, an acoustic barrier for airborne noise is provided and a moisture barrier can be established in a desired location of a structural member.

An alternative important feature of the present invention is the provision of a precast reinforcement insert that yields unitary reticulated reinforcement having large openings which permit air flow and water flow through the reinforcement if desired.

These and other features, objects and advantages of the invention will become apparent upon studying the specification in view of the attached drawings and appended claims.

DESCRIPTION OF THE DRAWINGS

FIG. 1 is a perspective view of an automobile having schematically represented structural members reinforced with the reinforcement insert of the present invention.

FIG. 2 is a schematic cross-sectional view of the lower die with the resin pellets contained therein.

FIG. 3 is a schematic cross-sectional view of the lower die with resin pellets and unexpanded polystyrene contained therein.

FIG. 4 is a schematic cross-sectional view showing the upper die in engagement with the lower die, enclosing the resin pellets and cellular polystyrene as a heated medium is supplied to the mold to expand the cellular polystyrene.

FIG. 5 is a perspective view of the precast reinforcement insert of one embodiment of the present invention placed in the structural member to be reinforced.

FIG. 6 is a schematic side elevational, cross-sectional view showing the structural member and insert as they are processed through an oven.

DESCRIPTION OF THE PREFERRED EMBODIMENT

Figure 7:
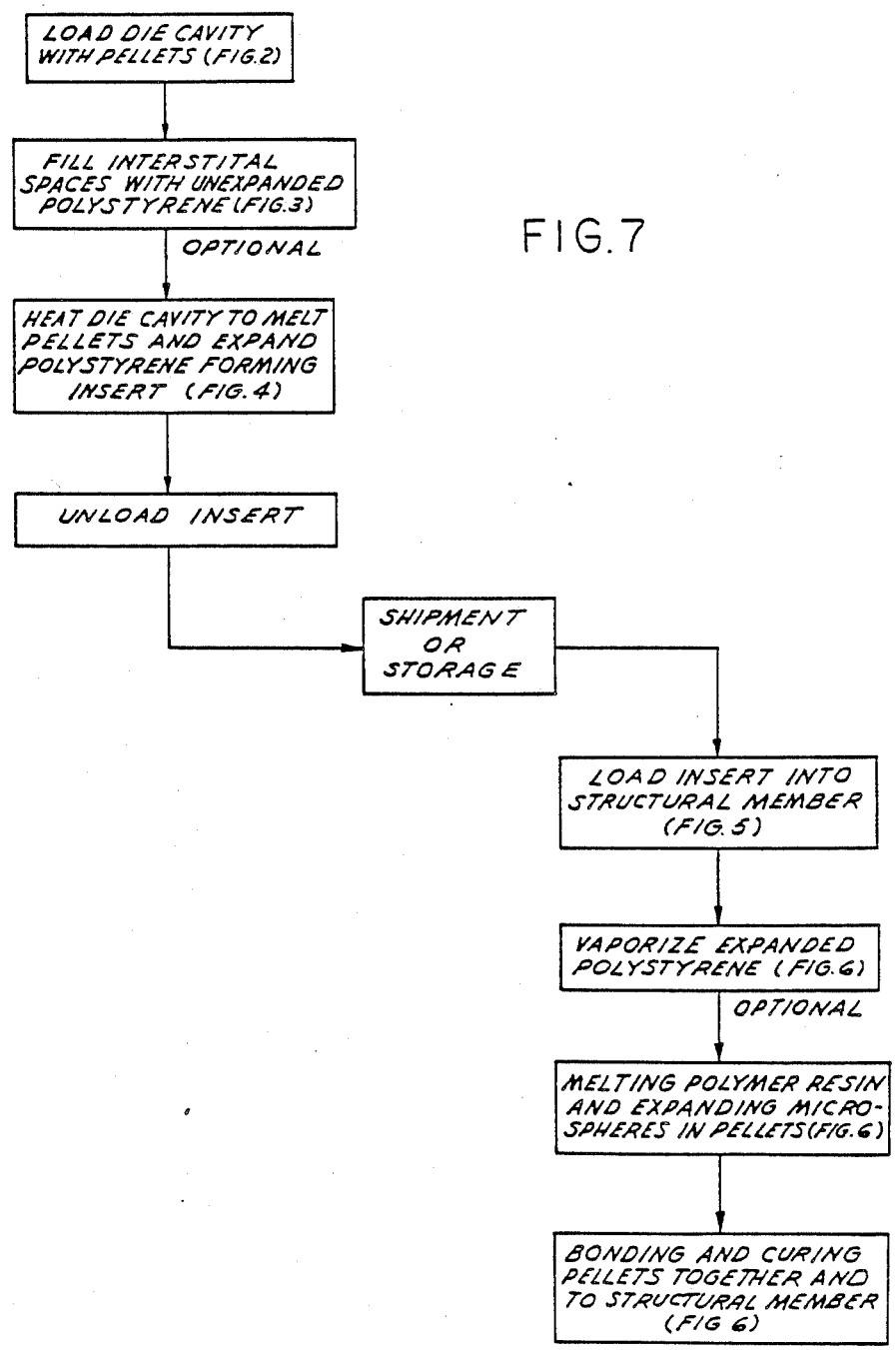
FIG. 7 is a block diagram illustrating the steps of the method of the present invention.

Referring to FIG. 1, a precast reinforcement insert 10 is shown installed in a structural member 12 of automobile 14. It should be understood that the reinforcement insert and method of making and using the same of the present invention is particularly well-suited for automobile assembly but may also be advantageously used in the manufacture of appliances, aircraft and other products having reinforced structural members.

Referring now to FIGS. 2 and 7, the process of making a precast reinforcement insert 10 is shown to include an initial step of loading a plurality of pellets 15 into a mold cavity 16 formed in a lower die 18. The mold cavity 16 is preferably coated with tin or polytetrafluoroethylene so that epoxy resins will not adhere thereto. Interstitial spaces 20 are provided between adjacent pellets 15 and the walls of the mold cavity 16. The amount of interstitial spacing depends upon the size and shape of the pellets 15. The pellets 15 are formed of a mixture of a thermosetting polymeric resin and a blowing ageint. As used herein, the term "blowing agent" will be construed to include liquid blowing agents or particulate blowing agents such as thermally expandable microspheres.

The polymeric resin is preferably a one-part epoxy which also includes a high temperature curing agent and an accelerator for curing the epoxy. The one-part epoxy is preferably an epoxy resin dispersion commercially available as Celanese CMD 35201, a proprietary material identified as a non-ionic aqueous dispersion of a solid bisphenol A epoxy resin. The curing agent is preferably a high temperature curing agent commercially available as Di-Cy in the range of about two to five percent of resin weight and preferably two to three percent of resin weight. Di-Cy is a latent curing agent which provides single package stability and rapid cures at elevated temperatures and is of the dicyandiamide type. The accelerator is preferably 2-ethyl, 4-methyl imidazole which is mixed with the resin in the amount of between 0.02 to 0.05 percent of the resin weight. The blowing agent mixed with the resin to form the pellets may be either thermoplastic microspheres or a liquid form blowing agent which is added to the mixture at a rate dependent upon the expansion desired. Suitable microspheres are commercially available under the trademark "Expancel 551-DU" from the Expancel Corporation, which is added to the pellet mixture at a ratio of 0.25 to 5.0 percent of the resin weight. A liquid blowing agent suitable for use in the invention is commercially available as Celogen TSH from Uniroyal, Inc., which is added to the mixture at a ratio of 0.25 to 3.0 percent of resin weight.

The pellets 15 also preferably include a filler material depending upon the desired bulk density of the finished pellets. The preferred filler materials may be inorganic or organic pre-expanded microspheres including silica glass microspheres, inorganic microspheres, or thermoplastic microspheres. Other fillers may also be used, such as fumed silica or calcium carbonate. In the preferred embodiment, pre-expanded microspheres are added to the pellet mixture at the rate of between 2.75 to 3.5 times the resin volume.

When a one-part epoxy resin is used, it is preferred to B-stage the resin by mixing the resin mixture and thermally reacting it beyond the A-stage of the material so that the product has only partial solubility in common solvents or water. In automotive assembly plants, assembly of the automobile body including installation of all reinforcements is completed prior to the final cleaning, surface treatment and painting operations. During the surface treatment operations, the automobile body is immersed in a series of alkaline cleaners, zinc phosphate coating solutions and other solutions which may attack the epoxy resin in the pellts. Therefore, it is desirable to either partially or completely B-stage the pellets in addition to embedding the pellets in polystyrene to prevent attack by such solutions.

As an alternative to one-part epoxy resins, it is anticipated that other thermosetting polymeric resins such as polyester thermoplastic pellets may be used in the present invention. If polyester pellets are used, it is not necessary to B-stage the pellets since they are not subject to attack by the immersion solutions. At the present time, thermoplastic polyester pellets are not preferred primarily due to cost considerations of the raw material even though the thermoplastic polyester pellets could be combined with the unexpanded microspheres with less mixing and no thermal treatment. Also, the polyester resin would not require a curing agent or accelerator and the cure would be accomplished merely by heating the insert to the thermosetting temperature of the material.

Referring now to FIGS. 3 and 7, the next step in the process is filling the interstitial spaces 20 between the pellets 15 and the walls of the mold cavity 16 with unexpanded polystyrene pellets 22. The unexpanded polystyrene pellets 22 may be blown into the mold cavity 16 and a vacuum source may be connected to vacuum ports 23, located in the bottom and sides of the mold cavity 16, or alternatively, the lower die 18 may be vibrated as it is filled to assure complete filling of the interstitial space 20. If the alternative form of the insert is to be made, which does not include a styrofoam matrix, this step can be deleted.

Referring now to FIGS. 4 and 7, the next step in the process is shown to include closing the mold cavity 16 by placing the upper die 24 over the lower die 18, thereby enclosing the pellets 15 and the unexpanded polystyrene pellets 22 within the mold cavity 16. Steam, heated air or another gas is then injected through the fitting 26 to cause the polystyrene pellets 22 to expand, forming expanded polystyrene 22′ which captures and retains the pellets 15. The expanded polystyrene 22′ is molded into a precast reinforcement insert 10 which is cooled and removed from the mold cavity 16. If the alternative form of the insert is to be made which does not include a styrofoam matrix, the heated medium is used to partially melt and bond the pellets together in a unitary insert.

Referring now to FIGS. 5 and 7, the insert 10 is shown placed in a structural member 12 in contact with the walls 28 of the structural member 12. The insert 10 is shown in FIG. 5 to include the optional expanded polystyrene 22′ which retains the pellets 15. The insert 10 is preferably slightly smaller than the space provided between the walls 28 of the structural member, thereby permitting placement of the insert 10 within the structural member 12.

Referring now to FIGS. 6 and 7, the structural member 12 and insert 10 are shown with a cover 30 disposed over the insert which substantially encloses the insert 10 within the structural member 12. The structural member 12, insert 10 and cover 30 are shown schematically within a paint curing oven 32 wherein the structural member 12 and insert 10 are heated, causing the insert 10 to undergo a series of time and temperature related programmed changes. The paint oven 32 includes a heat source 34 which is also schematically represented in FIG. 6. The programmed changes in the insert caused by heating over time will be described below in detail.

The method of the present invention is described with reference to two distinct phases shown diagrammatically in FIG. 7 with the first phase being the method of forming the precast insert 10 and the second phase being the method of reinforcing a structural member with the precast insert 10. The first step in forming the precast, composite plastic insert 10 is filling a mold cavity with one-eighth inch cylindrical pellets of the type previously described. The use of other size or shaped pellets will affect the quantity of interstitial space 20 in the mold cavity 16. Next, the interstitial space 20 between the pellets and the walls of the mold cavity 16 are optionally filled with unexpanded polystyrene pellets 22 which are preferably smaller than 0.01 inches in diameter. The mold 10 is then closed, trapping the pellets 15 and the unexpanded polystyrene 22 within the mold cavity 16. Then, the mold cavity 16 is heated to cause the unexpanded polystyrene 22 to expand, encasing the pellets within a unitary, expanded polystyrene matrix. The heat source used to expand the polystyrene may be steam, hot air or other gases directed through the mold cavity 16 or the polystyrene may be heated by placing the entire mold in an oven or by otherwise heating the die. If polystyrene is not desired, the heated medium is used to bond the pellets together in the space provided by the mold cavity. Following expansion of the polystyrene, the precast composite plastic insert 10 is then unloaded from the mold cavity 16.

The process may be conveniently interrupted at this point and the inserts may be shipped or stored until needed. If the expanded polystyrene 22′ is provided, it protects the pellets 15 during shipment and storage. The inserts 10 are ready to be loaded into a structural member to be reinforced without measurement, machining or any other process besides placing the same within the appropriate cavity of the structural member 12. If the insert 10 is mishandled or broken, it is not necessary to scrap the insert 10. Instead, the broken pieces of the insert 10 may be loaded into the structural member 12. In subsequent processing steps, the pellets will bond together through the previously cracked area. To be assured of proper reinforcement, the broken pieces of an insert should be placed in intimate contact with each other when placed in the structural member 12.

If the alternative form of the insert is used, the insert could be coated with a polymeric adhesive following removal from the mold cavity but prior to loading into the structural member to form a shell thereon. In other words, the insert may comprise a plurality of the pellets of the present invention partially bonded together to form the precast insert without a polystyrene matrix. In this embodiment, the insert is at least partially coated with a polymeric adhesive.

The second phase of the process, comprising the method of using the precast composite plastic insert 10 to reinforce a structural member, begins with the step of loading the precast composite plastic insert 10 into a structural member 12 comprising a shell or other frame member having a concave region for receiving the precast composite plastic insert 10. The structural member 12 preferably includes a cover 30 or shell closure member which partially encloses the insert 10.

In automotive assembly operations, modern manufacturing techniques include a series of immersion and spray surface treatments prior to painting. The baths commonly include alkaline cleaners and phosphate conversion coating steps which are intended to clean and coat the interior and exterior metal surfaces to inhibit corrosion and prepare the body for painting. When the assembly is immersed in a bath, internal cavities of structural members may become filled with fluids that must drain prior to moving to the next step in the surface treatment process. If significant quantities of a prior bath are carried by the assembly into a subsequent bath, the subsequent bath may become contaminated, thereby possibly interfering with its performance. It is an advantage of the present invention that the precast composite plastic insert is a unitary structure having few if any interstitial openings since the expanded polystyrene fills such interstitial openings between the pellets. The lack of interstitial openings facilitates drainage of fluids since there are no pockets to trap the fluids. The polystyrene or shell of polymeric adhesive act to protect the pellets from chemical attack during the dip baths. Following the phosphate coating process, the assembly is primed and painted, preferably in accordance with modern electro-deposited painting techniques.

The painting process is completed by passing the entire assembly into an oven which is maintained at a temperature of between 300 and 400 degrees F., or alternatively, between 250 and 350 degrees F. The structure is treated within the paint curing oven for a period of approximately twenty minutes, and preferably about 20 to 30 minutes, during which time the second phase of the process is completed. First, the expanded polystyrene 22', if provided, vaporizes within three to five seconds upon reaching a temperature of approximately 210 degrees F. Vaporize, as used herein, refers to the degradation of the expanded polystyrene 22' to a thin film or soot. After about one minute to about 15 minutes and preferably approximately 10 minutes in the paint curing oven, the expanded microspheres in the pellets expand upon reaching a temperature of between 200 and 300 degrees F. with the majority of the microspheres expanding at a temperature of about 250 degrees F. Expansion of the microspheres causes the pellets to swell, depending upon the quantity of unexpanded microspheres and the quantity of resin and pre-expanded microspheres in the insert 10. The pellets 15 begin to soften upon reaching a temperature of 220 degrees F., or after about three minutes in the paint curing oven, and since the expanded styrofoam 22' has previously vaporized, the pellets 15 are free to fall into place as they expand. The enlarged and melting pellets 15' conform to the walls 28 of the structural member, preferably substantially completely filling a predetermined section of the structural member 12. Upon reaching 250 to 270 degrees F., the pellets 15' begin to cure and after approximately five minutes in the paint curing oven, the pellets are fully cured and bonded to each other and to the walls 28 of the structural member 12 and the cover 30.

It should be understood that it is possible to vary the times and temperatures of the steps of the second phase to suit a particular manufacturing process. In general, when the invention is practiced with thermoset pellets, the pellets 15 have a curing temperature $T_c$ which is higher than the temperature $T_e$ at which the microspheres are expandable. The temperature $T_e$ is higher than the temperature $T_v$ at which the polystyrene vaporizes. When an epoxy resin is used, the curing temperature $T_c$ is determined by the selection of a curing agent and accelerator whereby the epoxy resin will be cured within the range of temperatures encountered in the process to which the structural member 12 is subjected. If the resin is a thermoset plastic material, such as an epoxy resin, the curing temperature $T_c$ is in actuality the thermosetting temperature of the resin which must be higher than $T_e$ and $T_v$.

When the invention is practiced with thermoplastic pellets, the pellets 15 are heated until they soften at a temperature $T_s$, generally at about 200 degrees to 220 degrees F. The pellets then may be programmed to expand by including a blowing agent, or thermally expandable microspheres, which expand upon reaching a predetermined temperature or temperature range $T_e$ which is generally higher than $T_s$ as previously described. The pellets are then cooled to resolidify and bond the reinforcement in place by cooling to below its softening temperature $T_s$.

If the unexpanded microspheres make up approximately two to five percent of resin weight, the pellets 15 will swell to a greater extent and will tend to form a solid reinforcement section having few if any voids. If the unexpanded microspheres make up from 0.25 to 1 percent of the resin weight of the pellet mix, the degree of expansion of the pellets will be reduced, resulting in a reinforcement which is characterized by large voids between adjacent pellets. Generally, it is not preferred to have small voids in the reinforcement since such small voids act as moisture traps. However, if desired, a reinforcement having such small voids may be prepared. The degree of expansion of the pellets 15 may also be affected by the size of the pellets 15 wherein the use of larger pellets will create a greater quantity of interstitial spacing. Also, the percent of pre-expanded microspheres provided in the pellets can act to limit the degree of expansion wherein less expansion will occur if more pre-expanded microspheres and less resin is provided in the pellet mixture.

The preferred form of the invention is to provide enough unexpanded microspheres and resin in the pellet mix to form a solid reinforcement having the minimum amount of voids, thereby enhancing the extent of reinforcement and permitting the reinforcement to function as an air and water flow inhibitor. Reduction of air flow is important if an acoustical barrier is desired within the structural member 12 and elimination of water flow is important for limiting corrosion.

One alternative to the method of making the reinforcement insert described above would be to coat the pellets 15 with unexpanded polystyrene pellets 22 immediately after forming the pellets 15 while their surface is tacky. The coated pellets 15 may then be blown into a mold cavity and the first phase of the process completed by expanding the polystyrene as described above.

In more detail, in one embodiment of the present invention, pellets 15 include a thermoplastic polymeric resin such as thermoplastic polyester. As will be appreciated by those skilled in the art, thermoplastics harden or solidify without substantial intermolecular crosslinking which is characteristic of thermoset curing. Thermoplastics in addition to thermoplastic polyesters are suitable for use herein so long as the principles of the present invention are faithfully observed. Again, pellets 15 contain either a blowing agent, which may comprise either a chemical blowing agent or a physical blowing agent, or unexpanded microspheres. As in the previous embodiments, the blowing agent or unexpanded microspheres serve to expand pellets 15 during later processing. That is, the formed pellets 15 comprise a mixture of thermoplastic resin and unexpanded microspheres or thermoplastic resin and a blowing agent which has not yet been activated. The most preferred blowing agent is a heat-activated blowing agent and the preferred unexpanded microspheres are thermally expandable. Pellets 15 also preferably contain a filler such as fumed silica, calcium carbonate or other suitable fillers.

As previously explained, a plurality of pellets 15 are placed in mold cavity 16 with unexpanded polystyrene pellets or beads 22 to form a fairly uniform mixture of beads and pellets in mold cavity 16 as shown in FIGS. 3 and 7. The mold is then closed and the contents heated to a temperature preferably just sufficient to expand polystyrene beads 22. As beads 22 expand they bond to one another and to pellets 15 to form an expanded polystyrene matrix which encases pellets 15. At this stage, pellets 15 are still substantially in their original form; that is, neither the blowing agent nor the unexpanded microspheres are activated by the polystyrene expansion process. In order to maintain the integrity of pellets 15 during the formation of the expanded polystrene matrix it is important that pellets 15 do not substantially melt during the polystyrene expansion process. Hence, the melting temperature of the thermoplastic used to form pellets 15 is preferably somewhat higher than the temperature of which the polystyrene beads are expanded. This completes the formation of the inventive precast structure or insert 10 which is then removed from mold cavity 16.

After precast insert 10 has been formed in the desired shape, as previously explained, it is transferred to a hollow structural member 12 such as that illustrated in FIGS. 6 and 7. Precast insert 10 is placed in structural member 12 and then heated in accordance with the following conditions. Unlike those embodiments of the present invention in which the resin component of pellets 15 is a thermoset material, no curing occurs in this embodiment. Precast insert 10 is heated such that the expanded polystyrene matrix is broken down by heat induced vaporization and combustion. In other words, precast insert 10 is heated to a temperature $T_a$ at which the polystyrene matrix is thermally degraded or disintegrated as previously indicated. Hence, at temperature $T_a$ the polystyrene matrix is thermally degraded from precast insert 10 by disintegration. Preferably also at temperature $T_a$, the blowing agent component of pellets 15 is thermally activated, causing pellets 15 to expand. Where unexpanded microspheres are used in lieu of a blowing agent, they too preferably expand at temperature $T_a$. It may be suitable to use a blowing agent or unexpanded microspheres which are activated at a temperature somewhat greater than $T_a$ as will be apparent from this description of the present invention. As the polystyrene matrix or support breaks down, the thermoplastic resin component begins to melt or soften. It is to be understood that the heat of precast insert 10 may be by stepped increases in temperature, or, more preferably by a sloped temperature increase as when the structural member and insert are placed in an oven or the like which has been preheated to a selected temperature. As the thermoplastic resin component softens, the activated blowing agent or microspheres cause pellets 15 to expand, contacting one another and filling the hollow structural member. As the pellets 15 melt and expand, they also bond together and to the surfaces of the structural member. It should be pointed out that as the polystyrene matrix is disintegrated, pellets 15 are free to fall into place as they expand. Further, it is to be understood that preferably pellets 15 are allowed to only partially melt such that they bond together in the structural member to form a body having a network of interstices defined by gaps between bonded pellets 15. Of course, the thermoplastic component of pellets 15 must be stable at temperature $T_a$. That is, up to temperature $T_a$, the temperature at which the expanded polystyrene matrix is thermally disintegrated, the thermoplastic resin used to form pellets 15 should resist thermal disintegration by combustion, vaporization or the like. Hence, the temperature at which the thermoplastic material of pellets 15 disintegrates, temperature $T_b$, should be higher than temperature $T_a$. In the bonding of recast insert 10 in the structural member 12, the temperature of precast insert 10 should always remain below temperature $T_b$. After pellets 15 have been partially melted together and to structural member 12, precast insert 10 is allowed to cool to a temperature at which the thermoplastic hardens.

The above description of a new, improved reinforcement and method of making and using the same is intended as an example and not in a limiting sense. It will be appreciated that the order of steps, materials, times and temperatures given above may be modified without departing from the spirit and scope of the invention. The scope of the invention is to be determined based upon the full scope of the following claims and all equivalents thereof.

I claim:

1. A precast composite reinforcement insert for a hollow structural member comprising:
   a plurality of thermoplastic pellets being formed of a mixture of a thermoplastic resin and unexpanded, thermally expandable microspheres; and
   a matrix of expanded polystyrene supporting said pellets.

2. The precast composite insert recited in claim 1, wherein said thermoplastic resin resists disintegration at a temperature $T_a$ at which said expanded polystyrene matrix disintegrates.

3. The precast composite insert recited in claim 2, wherein said pellets partially melt at a preselected temperature at which thermal expansion of said expandable microspheres is initiated.

4. The precast composite insert recited in claim 3, wherein said thermoplastic resin is thermoplastic polyester.

5. A method for reinforcing a hollow structural member comprising the steps of:
   placing a precast composite insert inside said structural member, said precast composite insert including a plurality of pellets formed of a thermoplastic resin and unexpanded, thermally expandable microspheres, said pellets being retained in a matrix of expanded polystyrene and said thermoplastic resin resisting thermal disintegration up to a preselected temperature $T_a$;
   thermally disintegrating said expanded polystyrene matrix by heating said insert to temperature $T_a$;
   expanding said unexpanded, thermally expandable microspheres in said pellets and substantially simultaneously partially melting said thermoplastic resin by continuing to heat said precast composite insert to partially bond said pellets to one another and to said structural member; and solidifying said thermoplastic resin by cooling said precast composite insert below the melting point of said thermoplastic resin.

6. The method for reinforcing a hollow structural member recited in claim 5, wherein said disintegrating, expanding and melting steps are carried in an oven wherein the temperature inside said oven is maintained above about 250 degrees F. and wherein said insert is heated for at least 5 minutes.

7. The method for reinforcing a hollow structural member recited in claim 5, wherein said thermoplastic resin is thermoplastic polyester.

8. The method for reinforcing a hollow structural member recited in claim 5, wherein said precast composite insert is formed by:

loading a mold cavity with a plurality of said pellets such that interstices between said pellets are defined;

filling said interstitial spaces between said pellets with unexpanded polystyrene beds;

heating said pellets and said unexpanded polystyrene beads at a temperature below the temperature at which said unexpanded microspheres expand to form an expand polystyrene matrix encasing said pellets;

cooling said pellets and said expanded polystyrene matrix; and unloading said precast composite insert from said mold cavity.

9. A method of forming a precast composite plastic insert for reinforcing a hollow structural member comprising the steps of:

loading a mold cavity with a substantially uniform mixture of thermoplastic pellets and unexpanded polystyrene beads, said thermoplastic pellets being formed of a thermoplastic resin and unexpanded microspheres;

heating said mixture of said thermoplastic pellets and unexpanded polystyrene beads to form an expanded polystyrene matrix encasing said thermoplastic pellets to form said precast composite plastic insert; and unloading said precast composite insert from said mold cavity.

10. The method of forming a precast composite plastic insert recited in claim 9, wherein said thermoplastic resin is a thermoplastic polyester resin.

11. A precast composite reinforcement insert for a hollow structural member comprising:

a plurality of thermoplastic pellets being formed of a mixture of a thermoplastic resin and a heat activated blowing agent; and a matrix of expanded polystyrene supporting said pellets.

12. The precast composite insert recited in claim 11, wherein said thermoplastic resin resists disintegration at a temperature $T_a$ at which said expanded polystyrene disintegrates.

13. The precast composite insert recited in claim 11, wherein said pellets partially melt at a preselected temperature at which heat activation of said heat activated blowing agent is initiated.

14. The precast composite insert recited in claim 11, wherein said thermoplastic resin is thermoplastic polyester.

15. A precast reinforcement insert for a structural member comprising:

a plurality of pellets including a mixture of a polymeric resin and a blowing agent; and a matrix of expanded polystyrene formed in interstitial spaces between said pellets.

16. A precast reinforcement insert for a structural member, comprising:

a plurality of pellets including a mixture of a thermoplastic polymeric resin and a heat-activated blowing agent, said pellets being partially bonded together to form said precast insert.

17. A precast reinforcement insert for a structural member, comprising:

a plurality of pellets including a mixture of a thermoplastic polymeric resin and unexpanded expandable microspheres, said pellets being partially bonded together to from said precast insert.

18. A method for reinforcing a hollow structural member comprising the steps of:

placing a precast composite insert inside said structural member, said precast composite insert including a plurality of pellets formed of a thermoplastic resin and a heat activated blowing agent, said pellets being retained in a matrix of expanded polystyrene and said thermoplastic resin resisting thermal disintegration up to a preselected temperature $T_a$;

thermally disintegrated said expanded polystyrene matrix by heating said precast composite insert to a temperature $T_a$;

activating said heat activated blowing agent in said pellets and substantially simultaneously partially melting said thermoplastic resin by continuing to heat said precast composite insert such that said pellets bond to one another and to said structural member; and solidifying said precast composite insert by cooling said pellets below the melting point of said thermoplastic resin.

19. The method for reinforcing a hollow structural member recited in claim 18 wherein said disintegrating, activating and melting steps are carried out in an oven, the temperature of said oven being maintained at about 250 degrees F., and wherein said precast composite insert is heated for at least 10 minutes.

20. The method for reinforcing a hollow structural member recited in claim 18, wherein said thermoplastic resin is thermoplastic polyester.

21. The method for reinforcing a hollow structural member recited in claim 18, wherein said precast composite insert is formed by:

loading a mold cavity with a plurality of said pellets such that interstices between said pellets are defined;

filling said interstitial spaces between said pellets with unexpanded polystyrene beads;

heating said pellets and said unexpanded polystyrene beads to a temperature below the temperature at which said heat activated blowing agent is activated to form an expanded polystyrene matrix encasing said pellets;

cooling said pellets and said polystyrene matrix; and unloading said precast composite insert from said mold cavity.

22. A method of forming a precast composite plastic insert for reinforcing a hollowing structural member comprising the steps of:

loading a mold cavity with a substantially uniform mixture of thermoplastic pellets and unexpanded polystyrene beads, said thermoplastic pellets being formed of a thermoplastic resin and a heat activated blowing agent;

heating said mixture of said thermoplastic pellets and unexpanded polystyrene beads to form an expanded polystyrene matrix encasing said thermoplastic pellets to form said precast composite plastic insert; and unloading said precast composite insert from said mold cavity.

23. The method of forming a precast composite plastic insert recited in claim 22, wherein said thermoplastic resin is a thermoplastic polyester resin.

* * * * *